United States Patent Office 3,423,951
Patented Jan. 28, 1969

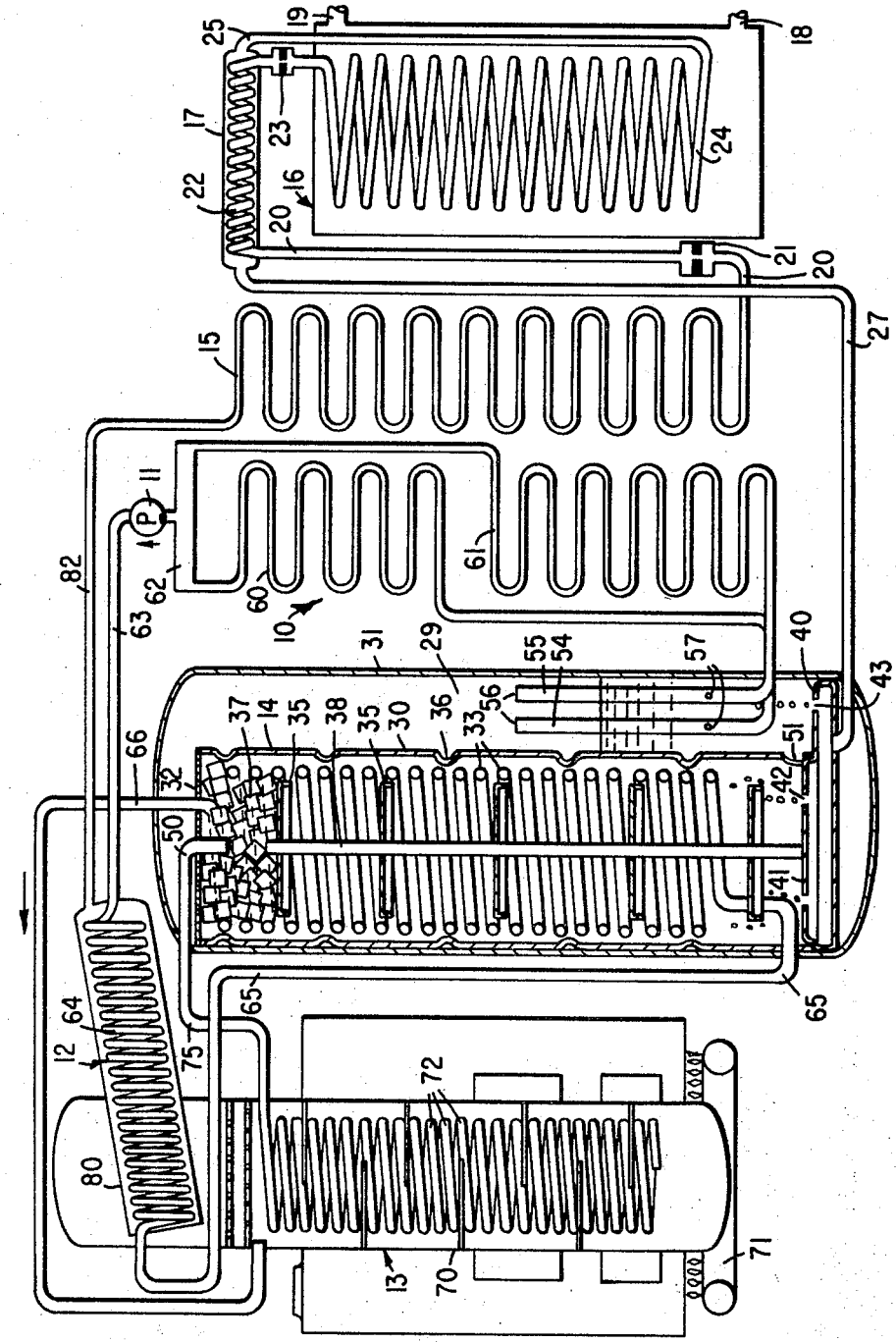

3,423,951
ABSORPTION REFRIGERATION SYSTEMS HAVING SOLUTION-COOLED ABSORBERS
Keith V. Eisberg, Indianapolis, Ind., assignor to Carrier Corporation, Syracuse, N.Y., a corporation of Delaware
Filed July 17, 1967, Ser. No. 653,954
U.S. Cl. 62—101                    20 Claims
Int. Cl. F25b 15/00, 15/12, 37/00

ABSTRACT OF THE DISCLOSURE

An absorption refrigeration system having a primary absorber, a solution-cooled absorber, a generator, a condenser, a rectifier, an analyzer, an evaporator, and a liquid-suction heat exchanger connected in a refrigerant circuit wherein the solution-cooled absorber is flooded with absorbent solution and refrigerant vapor from the evaporator is split into two portions, one of which is supplied to a solution-cooling chamber of a solution-cooled heat absorber, and the other of which bypasses the solution-cooling chamber, and passes directly to the primary absorber through a second solution chamber.

Background of the invention

This invention relates to absorption refrigeration systems employing a solution-cooled absorber for simultaneously passing strong and weak absorbent solutions in heat exchange relation with each other while contacting the cooled strong solution with refrigerant vapor from the evaporator prior to passage of refrigerant vapor to the primary absorber. An absorption refrigeration system employing a solution-cooled absorber is more efficient than a system using a conventional solution heat exchanger between strong and weak solutions, because a significant quantity of heat is recovered from the condensation of refrigerant vapor into the strong absorbent solution. This heat is then transferred into the weak absorbent solution passing to the generator. Thus, even though the refrigerant vapor is cooler than either the weak or strong solution, some of the heat given up by condensation or absorption of that vapor into the strong absorbent solution in the solution-cooled absorber is transferred into the weak solution, so that less heat need be supplied to the generator to boil the weak solution therein. In addition, the solution-cooled absorber also functions in the manner of a conventional heat exchanger to transfer heat between the weak and strong absorbent solutions.

While the solution-cooled absorber of the kind described is capable of providing some increase in efficiency of an absorption refrigeration system, the quantity of heat, which can be transferred to the weak absorbent solution, in excess of that which can be achieved in a conventional heat exchanger is limited by the fact that only a portion of the refrigerant supplied to the solution-cooled absorber is capable of being absorbed into absorbent solution and the remaining unabsorbed vapor merely cools the strong absorbent solution. While at first it might seem that cooling of the strong absorbent solution is desirable prior to its entrance into the primary absorber, it is, in fact, very undesirable, because the cooled solution can transfer only a limited amount of heat to the weak solution in the solution-cooled absorber. In other words, even though the refrigerant vapor gives up some of its heat, as a portion of it is absorbed in the solution-cooled absorber, the remaining unabsorbed vapor cools the strong solution and reduces the mean effective temperature difference between the weak and strong solutions. When the mean effective temperature difference between the strong and weak solutions is reduced, less heat is transferred between these solutions and the effectiveness of the heat exchanger is decreased.

Thus, while some gain in efficiency is possible by use of a solution-cooled absorber, this gain is largely offset by reduction in the effectiveness of the heat exchanger portion of the solution-cooled absorber, resulting in an undesirably small net gain in heat transfer and resulting efficiency.

In addition to the difficulties explained above, prior attempts to provide a solution-cooled absorber having a falling film of strong solution over the exterior surface of a weak solution heat exchanger, have been plagued by the difficulty of obtaining a uniform flow of solution over the heat exchanger, particularly if variations in the level of the solution-cooled absorber are experienced. Since it is not always possible to assure that the solution-cooled absorber is installed on a completely level surface, and because the level of the ground on which it is installed may shift after installation, prior solution-cooled absorbers have had difficulty achieving uniform wetting of weak solution heat exchanger which may result in drastically reduced system efficiency.

Furthermore, difficulty has been experienced in withdrawing a uniform quantity of vapor and solution from the solution-cooled absorber, due to "slugging" of liquid and vapor, upon the occurrence of slight variations in liquid level at the outlet. The "slugging" of liquid and vapor results in a poor mixture of vapor and solution in the primary absorber, and thus reduces the absorber effectiveness. Furthermore, when a plurality of outlets are employed for liquid and vapor, variations in the level of the system results in flooding one outlet and starving another outlet, unless precise measures are taken to assure a completely level system.

In addition, present solution-cooled absorbers have been troubled by accumulation of relatively noncondensible gases therein. After a period of time, the relatively noncondensible gases build up the pressure in the solution absorber to the point where further absorption of refrigerant is materially reduced. It has been necessary therefore to provide a purge mechanism for the solution-cooled absorber in order to withdraw the noncondensible gases to a suitable location. The provision of such a purge arrangement is complicated and increases the cost of employing solution-cooled absorbers.

Summary of the invention

In accordance with this invention, there is provided an absorption refrigeration system having a primary absorber, a solution-cooled absorber, a generator, a condenser, and an evaporator connected to form a refrigeration circuit, which overcomes the above problems.

Refrigerant vapor from the evaporator is split into two portions, one of which is supplied to the solution-cooled absorber, and the other of which is caused to bypass the solution-cooled absorber in passing to the primary absorber. The solution-cooled absorber is preferably disposed in a tubular shell having a partition therein dividing the shell into a solution-cooled absorber having a solution-cooling chamber and a second solution chamber. A weak solution heat exchanger is disposed in the solution-cooling chamber through which cool weak absorbent solution passes from the primary absorber to the generator. An inlet passage is provided from which warm strong absorbent solution from the generator is passed into the solution-cooling chamber to form a column of liquid therein which is in contact with the weak solution heat exchanger. The one portion of refrigerant vapor from the evaporator is passed upwardly through the column of strong absorbent solution in the solution-cooling chamber, where a substantial portion thereof is absorbed into the strong solution. The other portion of refrigerant vapor is passed into the second solution chamber. A passage is provided between the solution-cooling chamber of the solution-cooled absorber and the second solution chamber to admit strong absorbent solution into the second solution chamber.

A plurality of vapor-liquid passages extend from the second solution chamber to the primary absorber. The vapor-liquid passages have a vapor opening therein substantially above the level of strong absorbent solution and a liquid opening therein substantially below the level of strong absorbent solution in the second solution chamber, so as to make the vapor-liquid passages relatively insensitive to variations in level of absorbent solution or of the second solution chamber, thus assuring a uniform flow of solution and vapor to the primary absorber.

The division of refrigerant vapor between the solution-cooled absorber and the second solution chamber overcomes the problem of excessive cooling of strong solution in the solution-cooled absorber, while at the same time taking advantage of the gain in cycle efficiency achieved by transferring heat from all of the refrigerant vapor which can be absorbed in the solution-cooled absorber into the weak solution passing therethrough.

In practice, the amount of vapor, which is supplied to the solution-cooled absorber, is slightly in excess of that which can be absorbed therein in order to purge relatively noncondensible gases therefrom, and means is provided to pass the excess vapor into the second solution chamber. Thus, the problem of excessive accumulation of noncondensible gases in the solution-cooled absorber is similarly overcome, by sweeping the noncondensible gases out of the solution-cooled absorber along with the excess refrigerant vapor.

Furthermore, by maintaining a column of absorbent solution in the solution-cooled absorber, uniform wetting of the weak solution heat exchanger is assured in spite of the variations in the level of the solution-cooled absorber or of the level of solution therein. By introducing refrigerant vapor below the column of the absorbent solution, a foam or froth is generated in the solution-cooled absorber which maintains uniform wetting and provides excellent heat transfer with the weak solution heat exchanger.

*Brief description of the drawing*

The drawing illustrates an absorption refrigeration system having a solution-cooled absorber, shown in cross-section, embodying the principles of this invention.

*Description of the preferred embodiment*

Referring particularly to the drawing, there is illustrated an absorption refrigeration system of a type which employs ammonia as a refrigerant and water as an absorbent solution. While pure water is not technically a solution, it is customary to refer to the absorbent as being a solution, because it may have refrigerant dissolved therein, and the term "solution" is therefore used throughout this application to denote the absorbent.

The term "strong" solution is used herein to refer to an absorbent, which is strong in absorbing power, such as pure water. The term "weak" solution is used to denote an absorbent solution, which is weak in absorbing power, because it has a substantial quantity of refrigerant dissolved therein.

It will be appreciated that refrigerants, other than ammonia, and absorbents, other than water, may be employed within the scope of this invention, and that various modifications may be made in the system to accommodate different absorbents and refrigerants.

The absorption refrigeration system illustrated comprises a primary absorber 10, a weak solution pump 11, a rectifier 12, a generator 13, a solution-cooled absorber 14, a refrigerant condenser 15, a refrigerant evaporator 16, and a liquid-suction heat exchanger 17 connected to provide refrigeration.

Liquid refrigerant condensed in condenser 15 passes through refrigerant liquid passage 20 and refrigerant restriction 21 through heat exchange coil 22 of liquid-suction heat exchanger 17. The liquid refrigerant is cooled in coil 22 and emerges from the liquid-suction heat exchanger and passes through refrigerant restriction 23 into evaporator coil 24 in refrigerant evaporator 16.

A fluid medium, such as water, to be chilled passes over the exterior of the evaporator coil 24, where it is chilled by giving up heat to evaporate refrigerant within the coil. The chilled medium may then pass out of the evaporator 16 through line 18 to suitable remote heat exchangers (not shown), after which it is returned to the evaporator through inlets 19 for rechilling.

The cold refrigerant evaporated in evaporator coil 24 passes through refrigerant vapor passage 25 and through liquid-suction heat exchanger 17 in heat exchange relation with liquid refrigerant passing through coil 22. The refrigerant vapor then passes through refrigerant vapor passage 27 into solution-cooled absorber 14.

The solution-cooled absorber is formed by a tubular, preferably cylindrical, internal, sheet metal, shell-like baffle 30 which divides a tubular cylindrical exterior shell 31 into a solution-cooled absorber 14 and a second solution chamber 29. Exterior shell 31 is preferably closed at both ends. Baffle 30 forms a solution-cooling chamber and may be provided with a top cover plate having a plurality of vapor discharge apertures 32 therein forming vapor discharge passages to allow vapor to escape from solution-cooled absorber 14 into second solution chamber 29.

A weak solution heat exchanger 33, preferably comprising a helical coil, is disposed within solution-cooled absorber 14. A plurality of horizontal plates 35 are secured to central support 38 and arranged within baffle 30 to cooperate with annular grooves 36 and weak solution heat exchanger 33 to provide a tortuous counterflow passage for vapor and solution through the solution-cooling chamber of the solution-cooled absorber. Suitable packing 37, such as Raschig rings, may fill the space between the uppermost plate 35 and the top of solution-cooled absorber to reduce the tendency for solution froth to escape through discharge apertures 32.

A refrigerant vapor distributor header 40 is secured to close the bottom of baffle 30. Header 40 comprises a perforated upper plate 41 having a first set of refrigerant vapor inlet ports 42 and a second set of refrigerant vapor inlet ports 43 therein. Ports 42 may comprise a plurality of apertures forming refrigerant vapor inlet passages, which can be conveniently arrayed in a circular pattern and which are aligned with the solution-cooling chamber of solution-cooled absorber 14 to discharge one portion of refrigerant vapor therein. Ports 43 are arrayed so as to discharge the other portion of refrigerant vapor into second solution chamber 29. As illustrated in the drawing, baffle 30 may be disposed tangentially to shell 31, in which case, ports 43 are preferably arranged in a crescent corresponding to the shape of second solution chamber 29.

A strong solution inlet passage 50 is provided to admit strong absorbent solution into the top of the solution-cooling chamber in solution-cooled absorber 14 from which it passes downwardly through the solution-cooled absorber in counterflow to upwardly passing refrigerant vapor and weak solution inside coil 33. A strong solution discharge passage 51 is provided adjacent the lower portion of baffle 30 for the passage of strong solution from the solution-cooling chamber of solution-cooled absorber 14 into second solution chamber 29. Second solution chamber 29 forms a part of the discharge passage from solution-cooled absorber 14 to primary absorber 10.

Primary absorber 10 comprises a plurality of absorber circuits 60 and 61 only two of which are shown for clarity of illustration. In practice, any number of absorbent circuits may be employed, and a number of absorbent circuits may terminate in an additional absorbent circuit connected in series therewith.

Strong solution discharge passages 54, 55, comprising vapor-liquid passages, are provided for passing a mixture of refrigerant vapor and strong solution out of second solution chamber 29 to primary absorber 10. A like number of strong solution discharge passages 54 and 55 are provided to pass a mixture of vapor and liquid to the absorber circuits. Each of the discharge passages comprises a tubular member having an upper open end 56 comprising a vapor inlet, which is above any normally likely level of absorbent solution in second solution chamber 29. Each of the discharge passages also has a strong solution inlet aperture 57 formed therein, which is disposed below any normally likely level of absorbent solution in second solution chamber 29. Thus, end 56 and aperture 57 may be said to be "substantially" above and below the level of solution in second chamber 29.

The construction of discharge passages 54, 55 makes the discharge of liquid and vapor from second solution chamber 29 relatively insensitive to normally encountered variations in the level of solution in chamber 29 as well as to variations in the level of shell 41, because slight variations result in only small variations in static head. This arrangement also prevents slugs of vapor and liquid from passing to the absorber, because the inlet for solution is always below the surface thereof. This insures a uniform mixed flow of liquid and vapor to the absorber under all conditions. Furthermore, any desired number of absorber circuits can be accommodated with corresponding horizontally spaced discharge passages by this arrangement, because slight variations in the level of the second solution chamber, or the level of the solution therein will not cause an uneven flow of vapor and liquid to any one of the discharge passages.

In practice, it has been found convenient to actually run vapor passage 27 through second solution chamber 29, and to vent the upper portion of passage 27 to the upper portion of the second solution chamber above the solution level therein by forming a small aperture in the passage to prevent syphoning of solution therefrom upon shutdown of the system. However, this detail is omitted from the drawing for clarity of illustration.

A cooling medium, preferably ambient air, is passed over the absorber to cool the absorbent solution therein to promote the absorption of additional refrigerant vapor therein. The same cooling air may also pass over condenser 15 to condense refrigerant therein.

Cold weak absorbent solution passes from absorber 10 and is pumped by weak solution pump 11 through solution passage 63 and rectifier heat exchange coil 64. The weak solution then passes through weak solution passage 65 to weak solution heat exchanger 33 in solution-cooled absorber 14. The warmed weak solution passes from weak solution heat exchanger 33 through weak solution passage 66 and is discharged into the upper section of generator 13 along with any vapor formed in coil 33.

Generator 13 comprises a finned shell 70 heated by a gas burner or other suitable source 71 and is provided with an analyzer heat exchange coil 72 in the upper portion thereof. The weak solution is boiled in generator 13 to concentrate the weak solution, thereby forming a strong solution, and to generate refrigerant vapor, thereby separating the vapor from the absorbent solution.

The hot strong absorbent solution passes upwardly through the analyzer section of generator 13 through analyzer coil 72 in heat exchange with weak solution passing downwardly over the analyzer coil. The warm strong solution then passes through strong solution passage 75 and is discharged into the upper portion of solution-cooled absorber 14, preferably over packing 37.

Refrigerant vapor formed in generator 13 passes upwardly through the analyzer section thereof where it is concentrated by mass transfer with weak solution passing downwardly over analyzer coil 72. The vapor passes into the shell 80 of rectifier 12, where it is further concentrated by heat exchange with the cold weak solution passing through rectifier coil 64. The concentrated refrigerant vapor passes from rectifier 12 through refrigerant vapor passage 82 into condenser 15, where it is cooled and condensed by heat exchange with ambient air or other fluid medium passing over the condenser.

In operation, solution-cooled absorber 14 serves to pass cool weak solution from absorber 10 via rectifier coil 64 in heat exchange relation with warm strong solution from generator 13 via analyzer coil 72, while simultaneously cold refrigerant vapor from evaporator 16 via liquid-suction heat exchanger 17 is passed in heat and mass transfer relation with the strong solution in the solution-cooling chamber of the solution-cooled absorber.

The components of the system are disposed and the passages are sized so that a column of absorbent solution is maintained in the solution-cooling chamber of solution-cooled absorber 14 and in second solution chamber 29 having a level substantially above the bottom thereof. The upward passage of vapor through the column of absorbent solution and the solution-cooling chamber causes foaming or frothing of the refrigerant-liquid mixture therein, so that weak solution heat exchanger 33 is substantially covered with the vapor-liquid mixture under all conditions of operation. Accordingly, heat exchanger 33 is uniformly wetted at all times and excellent heat transfer is achieved between the vapor-liquid mixture and the weak solution, even though the solution-cooled absorber may be slightly out of precisely vertical alignment. The passage of vapor through the column of absorbent solution in the solution-cooled absorber also serves to preheat the vapor before it contacts heat exchanger 33 to prevent excessive cooling thereof.

Preferably an amount of vapor is supplied through vapor ports 42 in plate 41 of refrigerant vapor header 40, which is only slightly in excess of the quantity of vapor absorbed into the strong absorbent solution in solution-cooled absorber 14. The other portion of the vapor passes through vapor ports 43 in the second solution chamber 29 and from there to primary absorber 10, bypassing the solution-cooled absorber.

Consequently, the strong solution in the solution-cooling chamber of solution-cooled absorber 14 is not contacted by refrigerant vapor greatly in excess of that which can be absorbed therein. Therefore, the strong solution is not excessively cooled by contact with all of the cold vapor formed in the evaporator. On the other hand, substantially all of the refrigerant vapor passing to the solution-cooled absorber is absorbed therein and gives up its heat of vaporization to the strong solution. Consequently, the maximum temperature difference between the strong and weak solutions in the solution-cooling chamber of the solution-cooled absorber is obtained so that maximum heat is transferred between the strong and weak absorbent solutions for greatest cycle efficiency.

It will be understood that even though the refrigerant vapor is colder than the weak solution in the solution-cooled absorber, it contains a substantial amount of heat of vaporization, which is released into the solution upon condensation or absorption into the strong solution. Since the efficiency of the cycle is determined, to a large extent, by the amount of heat which can be transferred from the strong to the weak solution, the use of a solution-cooled absorber wherein the heat of vaporization of the refrigerant vapor is partially recovered to preheat or even boil the weak solution before passage to the generator materially improves the efficiency of the cycle by reducing the heat input required to the generator. In accordance with this invention, refrigerant vapor is distributed between the solution-cooling chamber and the second solution chamber in a ratio to prevent excessive cooling of the strong solution by unabsorbed cold vapor, which would reduce the total heat transferred by decreasing the temperature difference with the weak solution.

The accumulation of relatively noncondensible gases, such as hydrogen, in the solution-cooling chamber reduces the quantity of refrigerant vapor which can be absorbed therein. Purging of the solution-cooled absorber is achieved by passing a quantity of refrigerant vapor thereto slightly in excess of that absorbed in the solution-cooled absorber. The excess vapor passes upwardly through the solution-cooled absorber and into second solution chamber 29 through apertures 32 in the top of baffle 30. As they pass upwardly through the solution-cooling chamber of the solution-cooled absorber, they sweep with them the noncondensible gases and carry them through apertures 32 into the second solution chamber 29, thus effectively purging the solution-cooled absorber. Suitable storage means (not shown) may be used in the absorbent solution circuit to store the relatively noncondensible gases for periodic purging from the system.

The excess refrigerant vapor from solution-cooling chamber of solution-cooled absorber 14, the other portion of refrigerant vapor from header 40 passing through the column of solution from vapor ports 43 and the strong solution passing from the solution-cooled absorber through strong solution passage 51 are accumulated in second solution chamber 29. The absorbent solution in solution-cooled absorber 14 and second solution chamber 29 may be referred to as strong solution, although it will be appreciated that it is actually at an intermediate concentration between that passing from generator 13 and that passing from primary absorber 10, because some refrigerant vapor has been absorbed therein.

The cooled mixture of absorbent solution and refrigerant vapor is then passed through discharge passages 54 and 55 into the circuits of primary absorber 10 for further cooling of the solution and further absorption of the refrigerant vapor.

It will be appreciated that various modifications of this invention may be envisioned within the scope thereof. For example, second solution chamber 29 may be omitted, if desired, by passing the other portion of the refrigerant vapor directly into primary absorber 10 through a bypass passage, which bypasses the solution-cooled absorber. In this case, it is desirable to use a vapor-liquid passage discharge arrangement similar to discharge passages 54 and 55 for withdrawal of absorbent solution in excess refrigerant vapor from the solution-cooled absorber. Also, discharge passages 54, 55 could comprise separate vapor and liquid passages, if desired, such as discharge passages 51, 32 from the solution-cooled absorber.

It will be also appreciated that solution-cooled absorber may take forms other than that shown in the drawing without departing from the scope of the invention. However, in accordance with this invention, it is desirable to distribute the refrigerant vapor so that a substantial part of the vapor passing to the solution-cooled absorber is absorbed therein, in order to achieve the maximum thermodynamic efficiency from the refrigeration system.

Accordingly, this invention may otherwise be embodied within the scope of the following claims.

I claim:

1. An absorption refrigeration system comprising:
   (A) an evaporator for evaporating refrigerant to produce cooling:
   (B) a primary absorber for absorbing evaporated refrigerant into an absorbent solution to form weak solution;
   (C) a generator for boiling weak absorbent solution to concentrate the weak solution and to form refrigerant vapor;
   (D) a condenser for condensing refrigerant vapor formed in said generator;
   (E) a solution-cooled absorber for transferring heat between strong absorbent solution passing from said generator to said absorber, weak absorbent solution passing from said primary absorber to said generator and refrigerant vapor passing from said evaporator to said primary absorber, said solution-cooled absorber including
      (1) a solution-cooling chamber;
      (2) strong solution inlet passage means for passing warm strong solution from said generator into said solution-cooling chamber;
      (3) a weak solution heat exchanger disposed in said solution-cooling chamber for passing cool weak solution from said primary absorber to said generator through said solution-cooling chamber in heat exchange relation with warm strong absorbent solution therein to cool said strong solution and to heat said weak solution;
      (4) discharge passage means for passing solution and any unabsorbed refrigerant vapor from said solution-cooling chamber to said primary absorber for absorption of said unabsorbed portion of refrigerant vapor into the solution in said primary absorber;
   wherein the improvement comprises,
   (F) refrigerant vapor inlet passage means for passing one portion of refrigerant vapor from said evaporator into said solution-cooling chamber for absorption of a quantity of said one portion of vapor into strong absorbent solution therein; and
   (G) refrigerant vapor passage means for separately passing another portion of refrigerant vapor from said evaporator to said primary absorber for absorption into absorbent solution therein, said other portion of refrigerant vapor bypassing said solution-cooling chamber in passing to said primary absorber.

2. An absorption refrigeration system as defined in claim 1 including means for maintaining a column of absorbent solution in said solution-cooling chamber, said refrigerant vapor inlet passage means to the solution-cooling chamber is disposed below the level of absorbent solution in said solution-cooling chamber, so that refrigerant vapor admitted therein passes upwardly through the column of absorbent solution in said solution-cooling chamber.

3. An absorption refrigeration system as defined in claim 1 including:
   (A) a second solution chamber adapted to contain a column of absorbent solution therein;
   (B) said discharge passage means comprising solution passage means for passing absorbent solution cooled in said solution-cooling chamber to said second solution chamber, and vapor passage means for passing any unabsorbed refrigerant vapor from said solution-cooling chamber into said second solution chamber;
   (C) said refrigerant vapor passage means for separately passing said other portion of refrigerant vapor from said evaporator to said primary absorber comprising means to pass said vapor into said second solution chamber; and
   (D) said discharge passage means further comprising a vapor-liquid passage for passing a mixture of said unabsorbed one portion and said other portion of refrigerant vapor and said absorbent solution from said second solution chamber to said primary absorber simultaneously through said vapor-liquid passage.

4. An absorption refrigeration system as defined in claim 3 including:
   (A) means for maintaining a column of absorbent solution in said solution-cooling chamber, and said refrigerant vapor inlet passage means being disposed below the level of absorbent solution in said solution-cooling chamber to admit refrigerant vapor therein below the level of said absorbent solution; and (B) means for maintaining a column of absorbent solution in said second solution chamber, and said vapor passage means, for passing said other portion of refrigerant vapor to said second solution chamber, being disposed below the level of absorbent solution therein.

5. An absorption refrigeration system as defined in claim 1 wherein said one portion of refrigerant vapor passed to said solution-cooling chamber consists of a quantity of refrigerant in excess of the quantity of vapor absorbed in said solution-cooling chamber so that any relatively noncondensible gases in said solution-cooling chamber are purged therefrom by being swept from said solution-cooling chamber along with the excesses unabsorbed refrigerant vapor passing from said chamber through said discharge passage means.

6. An absorption refrigeration system as defined in claim 1 wherein at least a portion of said discharge passage means for passing refrigerant vapor and absorbent solution from said solution-cooled absorber to said primary absorber includes a combined vapor-liquid passage having a vapor inlet positioned a substantial distance above a level of absorbent solution and having a solution inlet positioned substantially below said level of absorbent solution so that passage of absorbent solution and refrigerant vapor through said vapor-liquid passage is substantially unaffected by variations in the level of absorbent solution during operation thereof.

7. An absorption refrigeration system as defined in claim 1 including:
(A) a second solution chamber adapted to contain a column of absorbent solution therein;
(B) said discharge passage means comprising solution passage means for passing absorbent solution cooled in said solution-cooling chamber to said second solution chamber, and vapor passage means for passing any unabsorbed refrigerant vapor from said solution-cooling chamber into said second solution chamber;
(C) said refrigerant vapor passage means for separately passing said other portion of refrigerant vapor from said evaporator to said primary absorber comprising means to pass said vapor into said second solution chamber; and
(D) said discharge passage means further comprising a vapor-liquid passage for passing a mixture of refrigerant vapor and absorbent solution simultaneously from said second solution chamber to said primary absorber, said vapor-liquid passage means having a refrigerant vapor inlet substantially above the level of solution in said second solution chamber, and a solution inlet substantially below the level of solution in said second solution chamber, so that passage of solution and vapor to said absorber is substantially unaffected by variations in the level of said second solution chamber and by fluctuations in the level of absorbent solution therein.

8. A method of producing refrigeration from an absorption refrigeration system having a primary absorber, an evaporator, a generator, a condenser and a solution-cooled absorber, which comprises the steps of
(A) evaporating liquid refrigerant in the evaporator to produce cooling;
(B) absorbing refrigerant vapor formed in said evaporator into absorbent solution in the primary absorber, thereby forming weak nolution;
(C) heating weak absorbent solution in said generator to vaporize refrigerant therefrom, thereby concentrating the absorbent solution and forming strong solution;
(D) condensing refrigerant vapor formed in the generator to form liquid refrigerant; and (E) cooling strong absorbent solution from the generator by passing cool weak solution from the primary absorber in heat exchange relation therewith;
wherein the improvement comprises,
(F) contacting a portion of the refrigerant vapor from said evaporator with cooled strong absorbent solution from said generator in said solution-cooled absorber, thereby absorbing at least some of said fractional portion of refrigerant vapor into said strong solution;
(G) passing another portion of refrigerant vapor from said evaporator to said absorber, bypassing said solution-cooled absorber, for absorption into absorbent solution in said primary absorber; and
(H) passing absorbent solution and any unabsorbed refrigerant vapor from said solution-cooled absorber to said primary absorber for further cooling of said absorbent solution and further absorption of refrigerant vapor therein.

9. A method of producing refrigeration as defined in claim 8 including the steps of providing a column of absorbent solution in the solution-cooled absorber and wherein the step of contacting refrigerant vapor with cooled strong absorbent solution comprises passing said refrigerant vapor upwardly through said column of absorbent solution in the solution-cooled absorber.

10. A method of producing refrigeration as defined in claim 8 including purging the solution-cooled absorber of relatively noncondensible gases by passing a quantity of refrigerant vapor therethrough in excess of that which is absorbed into absorbent solution in the solution-cooled absorber, thereby sweeping said relatively noncondensible gases out of the solution-cooled absorber along with unabsorbed refrigerant vapor and preventing the accumulation thereof in the solution-cooled absorber.

11. An absorption refrigeration system comprising
(A) an evaporator for evaporating refrigerant to produce cooling;
(B) a primary absorber for absorbing evaporated refrigerant into an absorbent solution to form weak solution;
(C) a generator for boiling weak absorbent solution to concentrate the weak solution and to form refrigerant vapor;
(D) a condenser for condensing refrigerant vapor formed in said generator;
wherein the improvement comprises
(E) a solution-cooled absorber for transferring heat between strong absorbent solution passing from said generator to said absorber, weak absorbent solution passing from said primary absorber to said generator and refrigerant vapor passing from said evaporator to said primary absorber, said solution-cooled absorber including
(1) a solution-cooling chamber adapted to contain a column of absorbent solution;
(2) a weak solution heat exchanger disposed in said solution-cooling chamber for passing cool weak absorbent solution from said primary absorber to said generator through said solution-cooling chamber in heat exchange relation with warm strong absorbent solution therein to heat said weak absorbent solution and to cool said strong absorbent solution to thereby promote absorption of refrigerant vapor into the cooled strong absorbent solution;
(3) strong solution inlet passage means for passing warm strong absorbent solution from said generator into said solution-cooling chamber;
(4) discharge passage means for passing absorbent solution and any unabsorbed refrigerant vapor from said solution-cooling chamber to said primary absorber for absorption of refrigerant vapor into said absorbent solution therein, said discharge passage means cooperating with said system to maintain a column of absorbent solution in said solution-cooling chamber having a level substantially above the bottom thereof; and (5) refrigerant vapor inlet passage means for passing refrigerant vapor from said evaporator into said solution-cooling chamber at a point below the level of absorbent solution therein, to thereby form a mixture of refrigerant vapor and absorbent solution in said solution-cooling chamber in contact with said weak solution heat exchanger.

12. An absorption refrigeration system as defined in claim 11 including refrigerant passage means for passing another portion of refrigerant vapor from said evaporator to said primary absorber, said other portion of refrigerant vapor bypassing said solution-cooling chamber in passing to said primary absorber, to prevent substantial cooling of said strong solution in said solution-cooling chamber by said other portion of refrigerant vapor and to thereby maintain a substantial temperature difference between the strong and weak absorbent solution in said solution-cooling chamber for heat transfer therebetween.

13. An absorption refrigeration system as defined in claim 11 including
  (A) a second solution chamber;
  (B) said discharge passage means comprising solution passage means for passing strong absorbent solution from said solution-cooling chamber to said second solution chamber, and vapor passage means for passing refrigerant vapor from said solution-cooling chamber to said second solution chamber; and
  (C) said discharge passage means further comprising a vapor-liquid passage extending from said second solution chamber, said vapor-liquid passage having a liquid inlet below the level of absorbent solution in said second solution chamber and a vapor inlet above the level of absorbent solution in said second chamber to maintain a substantially uniform simultaneous flow of vapor and solution from said second solution chamber to said primary absorber under various conditions of solution level in said second chamber.

14. An absorption refrigeration system as defined in claim 11 including
  (A) a second solution chamber;
  (B) said discharge passage means comprising solution passage means for passing strong absorbent solution from said solution-cooling chamber to said second solution chamber, and vapor passage means for passing refrigerant vapor from said solution-cooling chamber to said second solution chamber;
  (C) refrigerant passage means for passing another portion of refrigerant vapor from said evaporator to said second solution chamber, said other portion of refrigerant vapor bypassing said solution-cooling chamber in passing to said primary absorber; and
  (D) said discharge passage means further comprising a vapor-liquid passage extending from said second solution chamber for passing a mixture of refrigerant vapor and absorbent solution to said primary absorber.

15. A method of producing refrigeration from an absorption refrigeration system having a primary absorber, an evaporator, a generator, a condenser, and a solution-cooled absorber, which comprises the steps of:
  (A) passing cool weak absorbent solution from the primary absorber through the solution-cooled absorber to the generator;
  (B) passing warm strong absorbent solution from said generator through said solution-cooled absorber to said primary absorber, and forming a column of weak solution therein which is in heat exchange relation with said cool weak absorbent solution passing therethrough, thereby cooling the strong solution and warming the weak solution in said solution-cooled absorber; and
  (C) passing at least a portion of refrigerant vapor from said evaporator through the column of strong absorbent solution in said solution-cooled absorber in direct contact therewith to absorb at least a portion of said refrigerant vapor in said strong solution, and thereby transferring heat from said refrigerant vapor to said weak absorbent solution by transferring the heat of vaporization of the absorbed refrigerant vapor into the column of strong absorbent solution in heat exchange relation with weak absorbent solution.

16. A method of providing refrigeration as defined in claim 15 including the additional step of passing another portion of refrigerant vapor from said evaporator to said primary absorber for absorption therein, said other portion of refrigerant vapor bypassing said solution-cooled absorber.

17. A method of providing refrigeration as defined in claim 15 including passing a greater quantity of refrigerant vapor to said solution-cooled absorber than is absorbed therein; and purging any relatively noncondensible gases from the solution-cooled absorber by passing the excess unabsorbed refrigerant vapor from the solution-cooled absorber to the primary absorber so as to remove the relatively noncondensible gases from said solution-cooled absorber along with the refrigerant vapor.

18. An absorption refrigeration system comprising:
  (A) an evaporator for evaporating refrigerant to produce cooling;
  (B) a primary absorber for absorbing evaporated refrigerant into an absorbent solution to form weak solution;
  (C) a generator for boiling weak absorbent solution to concentrate the weak solution and to form refrigerant vapor; and
  (D) a condenser for condensing refrigerant vapor formed in said generator;
  wherein the improvement comprises:
  (E) a tubular exterior shell;
  (F) an interior baffle member disposed within said exterior shell and spaced from a wall thereof to divide said exterior shell into a solution-cooling chamber on one side of said baffle and a second solution chamber on the other side of said baffle;
  (G) strong solution inlet passage means for discharging strong solution from said generator into said solution-cooling chamber;
  (H) heat exchange passage means disposed in said solution-cooling chamber for passing weak absorbent solution through said solution-cooling chamber in heat exchange relation with strong solution therein;
  (I) refrigerant vapor distributor means comprising a refrigerant vapor header connected to receive refrigerant vapor from said evaporator, said header having at least one aperture therein disposed in communication with said solution-cooling chamber for distributing one portion of refrigerant vapor from said evaporator into said solution-cooling chamber for absorption into absorbent solution therein, said header also having at least another aperture therein disposed in communication with said second solution chamber for distributing another portion of refrigerant vapor from said evaporator into said second solution chamber;
  (J) solution passage means for passing absorbent solution from said solution-cooling chamber to said second solution chamber; and
  (K) discharge passage means for passing unabsorbed refrigerant vapor and absorbent solution from said second solution chamber to said primary absorber.

19. An absorption refrigeration system as defined in claim 18 including:

(A) said discharge passage means cooperating in said system to maintain a column of absorbent solution in said solution-cooling chamber; and (B) said one aperture in said refrigerant vapor header being disposed below the level of solution in said solution-cooling chamber so that cold refrigerant vapor entering said solution-cooling chamber passes through said column of absorbent solution therein.

20. An absorption refrigeration system as defined in claim 18 including vapor passage means for passing any unabsorbed refrigerant vapor from the upper portion of said solution-cooling chamber to said second solution chamber for removal of any relatively noncondensible gases from said solution-cooling chamber along with said refrigerant vapor.

References Cited

UNITED STATES PATENTS

| | | | |
|---|---|---|---|
| 1,955,298 | 4/1934 | Knight | 62—484 |
| 2,092,733 | 9/1937 | Gruber | 62—479 |
| 2,283,213 | 5/1942 | Katzow | 62—484 |
| 3,126,720 | 3/1964 | Stubblefield | 62—494 |
| 3,273,350 | 9/1966 | Taylor | 62—101 |
| 3,369,373 | 2/1968 | Merrick | 62—476 |

LLOYD L. KING, *Primary Examiner.*

U.S. Cl. X.R.

62—476, 484, 494